(12) United States Patent
Ravichandran et al.

(10) Patent No.: US 11,220,177 B2
(45) Date of Patent: Jan. 11, 2022

(54) VEHICLE TORQUE SHAPING

(71) Applicant: Ford Global Technologies, LLC, Dearborn, MI (US)

(72) Inventors: Maruthi Thiruninravur Ravichandran, Hamilton (CA); Jeffrey Allen Doering, Canton, MI (US); Rajit Johri, Canton, MI (US); Bhavesh Ravindra Paradkar, Canton, MI (US); Dushyant K. Palejiya, Canton, MI (US); Jason Meyer, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 290 days.

(21) Appl. No.: 16/521,885

(22) Filed: Jul. 25, 2019

(65) Prior Publication Data

US 2021/0023944 A1    Jan. 28, 2021

(51) Int. Cl.
| | |
|---|---|
| *B60K 23/08* | (2006.01) |
| *B60W 10/02* | (2006.01) |
| *B60W 50/038* | (2012.01) |
| *F16H 1/28* | (2006.01) |

(52) U.S. Cl.
CPC ......... *B60K 23/0808* (2013.01); *B60W 10/02* (2013.01); *B60W 50/038* (2013.01); *F16H 1/2863* (2013.01); *B60K 2702/06* (2013.01); *B60W 2520/40* (2013.01)

(58) Field of Classification Search
CPC  B60K 23/0808; B60K 2702/06; B60K 26/02; B60K 23/00; B60W 10/02; B60W 50/038; B60W 2520/40; B60W 50/00; B60W 10/06; B60W 40/00; B60W 10/08; B60W 2050/0043; B60W 2540/10; B60W 2710/0666; B60W 2520/00; F16H 1/2863; B60Y 2400/301
See application file for complete search history.

(56) References Cited

U.S. PATENT DOCUMENTS

| | | |
|---|---|---|
| 7,676,315 B2 | 3/2010 | Doering et al. |
| 7,917,275 B2 | 3/2011 | Doering et al. |
| 8,239,113 B2 | 8/2012 | Doering et al. |
| 8,332,111 B2 | 12/2012 | McDonnell et al. |
| 8,447,491 B2 | 5/2013 | Templin |
| 8,635,001 B2 | 1/2014 | Doering et al. |
| 8,793,057 B2 | 7/2014 | McDonnell et al. |
| 8,825,340 B2 | 9/2014 | Kim et al. |
| 9,227,619 B2 | 1/2016 | Doering et al. |

(Continued)

OTHER PUBLICATIONS

Hermansson et al., "Control of an Electric Vehicle Powertrain to Mitigate Shunt and Shuffle", Master's thesis in Automotive Engineering, Jun. 1, 2016, Sweden, 99 pages.

*Primary Examiner* — Marthe Y Marc-Coleman
(74) *Attorney, Agent, or Firm* — David B Kelley; Brooks Kushman P.C.

(57) ABSTRACT

A vehicle includes an actuator, a drivetrain configured to receive mechanical power from the actuator, an accelerator pedal position sensor configured to output a driver-demanded torque, and a controller in electric communication with the sensor and the actuator. The controller is programmed to receive the driver-demanded torque and output a shaped torque command to mitigate driveline disturbances caused by backlash and shaft compliance.

20 Claims, 7 Drawing Sheets

(56) References Cited

U.S. PATENT DOCUMENTS

2013/0291830 A1\* 11/2013 Doering ................. B60K 6/387
                                                                123/350
2017/0282920 A1\* 10/2017 Ortseifen .............. B60W 10/06
2018/0015926 A1\*  1/2018 Cunningham ........ B60W 50/10
2018/0345973 A1\* 12/2018 Krueger ................ B60W 10/06

\* cited by examiner

VEHICLE TORQUE SHAPING

TECHNICAL FIELD

This disclosure relates to mitigating disturbances caused by backlash and shuffle within a vehicle drivetrain by shaping driver-demanded torque accordingly.

BACKGROUND

Audible and tactile events may occur within a vehicle drivetrain during transient torque events and may be caused by lash in the mechanical couplings (such as gears, splines, or U-joints) of the drivetrain. Longitudinal acceleration of the vehicle may also occur during transient torque events due to shuffle.

SUMMARY

According to one embodiment, a vehicle includes an actuator, a drivetrain configured to receive mechanical power from the actuator, an accelerator pedal position sensor configured to output a driver-demanded torque, and a controller in electric communication with the sensor and the actuator. The controller is programmed to receive the driver-demanded torque and, responsive to the driver-demanded torque increasing at a rate exceeding a threshold and the drivetrain being in lash mode, (i) command a first torque to the actuator for a first duration of time, (ii) upon expiration of the first duration, command a second torque to the actuator that is greater than the first torque for a second duration of time, and (iii) upon expiration of the second duration, command a third torque to the actuator that is less than the second torque for a third duration of time, wherein the first, second, and third torques are less than the driver-demanded torque.

According to another embodiment, a vehicle includes an actuator, a drivetrain configured to receive mechanical power from the actuator, and a controller. The controller is programmed to, receive a driver-demanded torque and, in response to the drivetrain exiting lash during acceleration, command a torque to the actuator, for a duration of time, that is greater than the driver-demanded torque to create a temporary torque overshoot. The duration of time and a magnitude of the torque are both based on the driver-demanded torque.

According to yet another embodiment, a vehicle includes an actuator, a drivetrain configured to receive mechanical power from the actuator, and a controller. The controller is programmed to, in response to the drivetrain changing from an offgoing mode to an oncoming mode, and a difference between an initial torque command of the oncoming mode and a last torque command of the offgoing mode being less than a threshold, (i) command the initial torque to the actuator for a first duration of time and (ii) command a second torque to the actuator for a second duration of time that immediately follows the first duration of time. The controller is further programmed to, in response to the drivetrain changing from an offgoing mode to an oncoming mode, and a difference between the initial torque command and the last torque command exceeding the threshold, (i) command a clipped torque to the actuator for the first duration of time and (ii) command the second torque to the actuator for the second duration of time that immediately follows the first duration of time.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The disclosure relates to methods, systems, and controls that shape a driver-demanded torque to manage clunk and shuffle to improve drivability of the vehicle. The shaping is based on powertrain speed estimates/measurements, wheel speed estimates/measurements, vehicle speed estimates/measurements, powertrain torque estimates/measurements, accelerator pedal position, brake pedal position, driver selected mode (e.g., sport mode, eco mode, etc.), inferred or adapted drive mode (e.g., automatic mode change based on driver behavior), driver selected gear, and automatic transmission selected gear. The torque shaping may be different for different operating modes of the drivetrain, i.e., positive contact, negative contact, and lash modes, and for the transitions between these modes. The vehicle includes a set of logics that determines which mode the drivetrain is operating in. This determination is based on estimated/measured drivetrain speed, estimated/measured wheel speed, estimated/measured vehicle speed, driver-demanded torque, estimated/measured drive shaft torque, estimated/measured axle torque, estimated/measured wheel torque, and estimated/measured intermediate shaft torque. In one embodiment, the system includes an algorithm that estimates the change in driveshaft twist and the change in axle shaft twist. These estimates are used to ascertain the operating mode of the drivetrain, i.e., contact or lash.

The vehicle may include an algorithm that estimates the rate of change of the drive shaft torque, higher-order rate of change of the drive shaft torque, rate of change of the axle torque, higher order rate of change of the axle torque, position in the lash, and speed of lash crossing. For example, the vehicle may estimate the rate of change of the axle torque, the position in lash, and the speed of lash crossing and utilize these estimates as inputs to a multivariate control system described below. In another embodiment, the vehicle stores these estimates in one or more controllers and/or a cloud server. An automatic monitoring system and/or a skilled person utilizes these estimates to ascertain if a calibration change is required and/or a service visit is required in order to address the issue of unacceptable clunk and shuffle.

The system includes a multivariate switched control system that behaves differently in each drivetrain operating mode and in transitions between these modes. In one embodiment, the system includes a multivariate pre-compensator and a multivariate feedback controller for shaping torque when in the contact mode operation. During contact mode, the vehicle is controlled such that a commanded shaped torque overshoots the driver demanded torque for a brief period of time. This improves responsiveness of the drivetrain during tip-ins and tip-outs. During contact mode, the vehicle includes a transient anti-shuffle behavior that is manifested as oscillations in the shaped torque that are of opposite phase to the oscillations in the estimated rate of change of drive shaft/axle torque and/or of opposite phase to the oscillations in the high-order rates of change of the drive shaft/axle torque.

During lash mode operation, the system shapes the torque non-monotonically. These non-monotonic variations include step increases and step decreases, ramp increases and ramp decreases, etc. This helps the drivetrain cross lash more quickly while also reducing impact speed when the gears re-mesh at the end of the lash crossing. This system also manages transitions, i.e., changing from one mode to the next, to reduce abrupt torque changes. For example, the controller may apply lower bounds and upper bounds on the changes in shaped torque during transitions from one operating mode to another.

Figure 1:
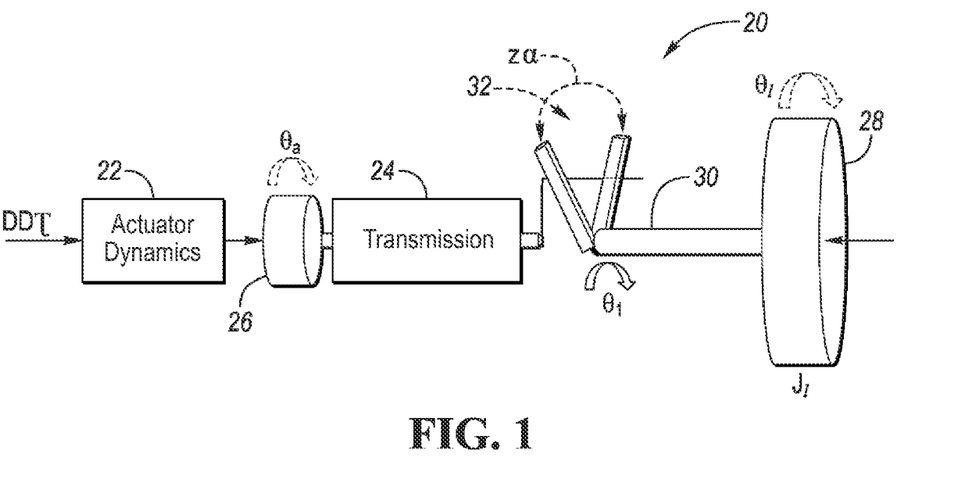
FIG. 1 is a schematic of an example vehicle powertrain.

Referring to FIG. 1, a vehicle powertrain 20 includes at least one actuator 22 that act as a power source. Used herein, term "actuator" means one or more actuators. The actuator 22 may be an internal combustion engine, an electric machine, or combinations thereof. The actuator 22 is operably coupled to a transmission 24 via a launch device 26. The launch device 26 may be a torque converter, a clutch, or the like. The transmission 24 is operably coupled to driven wheels 28 of the vehicle via axle shafts 30 and one or more other components such as a differential (not shown). The powertrain 20 contains backlash and compliance, which makes it difficult to transfer torque from the actuator 22 to the driven wheels 28 in a smooth and responsive manner.

Backlash (also called lash) arises due to the clearance between the rotating drivetrain components, e.g., clearance between the teeth of meshing transmission gears. This clearance produces play (lost motion) in the drivetrain such that when torque is reversed in the powertrain, backlash causes the mechanical connections in the drivetrain to disengage then reengage in the opposite direction. This is called lash crossing. If this lash crossing transition happens too quickly or abruptly, there may be a noise, vibration, and harshness (NVH) disturbance when the couplings re-engage on the other side of lash. The backlash is schematically illustrated in FIG. 1 by a vee 32 that represents total backlash (2α) in the powertrain 20. The backlash size is defined to be 2α so that the backlash angle $\theta_b$ is limited by $-\alpha \leq \theta_b \leq \alpha$. If a step increase of torque or a step decrease of torque is applied by the actuator 22, the backlash 32 may be traversed rapidly causing clunk (also known as shunt) when the gear teeth reengage. Clunk refers to the disturbance created when the gear teeth re-engage following a lash crossing. In general, clunk manifests as audible noise, in the frequency range of 1 kHz to 5 kHz. The powertrain 20 may be described as being in either contact mode or in backlash mode (also known as noncontact mode or lash mode). In contact mode, the gears are meshing on either the positive side or the negative side and in lash mode the gear teeth are disengaged as the drivetrain is transitioning through the lash crossing.

Compliance arises due to the flexibility of the rotating drivetrain components (e.g., twisting of the half-shafts, the driveshaft, etc.). If a step increase of torque or a step decrease of torque is applied by the actuator 22 to quickly shuffle may occur. Shuffle refers to the oscillations caused by the periodic twisting and untwisting of the shafts. Shuffle manifests as longitudinal vehicle jerk in the frequency range of 1 Hz to 15 Hz.

Clunk and shuffle can be mitigated by shaping the commanded actuator torque rather than just delivering the driver-demanded torque. The driver-demanded torque is shaped (changed) by a vehicle controller such that the noise, vibration, harshness (NVH) problems associated with the above discussed clunk and shuffle are maintained at acceptable levels. The proposed control system (described below) utilizes available powertrain measurements, such as actuator speed, transmission output speed, wheel speed, etc., to compute a shaped torque command based on driver-demanded torque. The control strategy is applicable to a variety of vehicle types including convention gasoline and diesel vehicles as well as electric and hybrid-electric vehicles.

The advent of electric throttle control allows vehicle designers to implement torque shaping strategies. Prior strategies, based on rate-limiting, filtering, and heuristic approaches, have successfully reduced the effects of clunk and shuffle, but have several drawbacks, such as (i) lacking robustness to variations in drivetrain parameters (these variations may occur due to variations in manufacturing, or due to ageing of the drivetrain components) and (ii) complex calibration procedures that are time-consuming and expensive.

The controls of this disclosure utilize feedback control to provide a control system that satisfies the driver-torque request as quickly as possible, ensures that drivetrain clunk and shuffle are maintained at acceptable levels, simplifies calibration, and is robust to variations in drivetrain parameters. Due to the feedback control design, the torque-shaping controls of this disclosure offers several advantages, such as: the drivetrain parameters (size of backlash, stiffness of half-shafts, inertia of actuator, etc.) and the drivetrain characteristics (frequency of shuffle) are directly taken into account in the design, thus reducing the efforts required to calibrate the system; the controller can track different trajectories of driver-demanded torque; and the controller provides straightforward calibration approaches to achieve a desired tradeoff between the levels of clunk and shuffle and the level of responsiveness of the vehicle. An important aspect of torque shaping control relates to the limitations of the actuator torque delivery, e.g., the slew-rate limit of the motor torque, the time delay in the reduction of the engine torque by spark retardation, etc. These actuator limitations result in performance degradation, especially from the point of view of regulation of the impact speed during the backlash traversal. In this control strategy, described below, we address this by including a predictive element in the control system.

Figure 2:
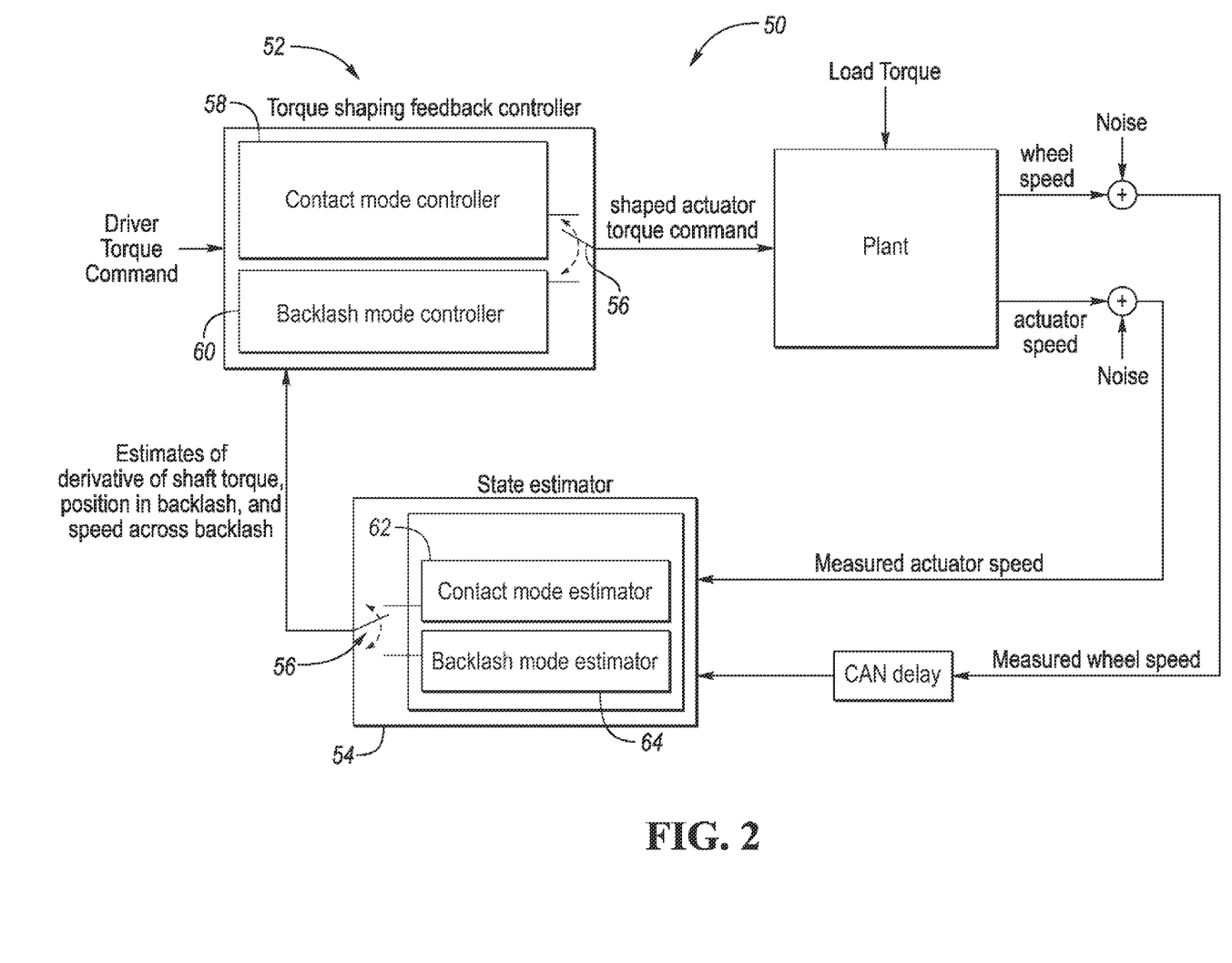
FIG. 2 is a schematic diagram illustrating a control system.

Referring to FIG. 2, a control system 50 may be provided as part of as a powertrain control unit (PCU), an engine control module (ECM), a motor control unit (MCU), or the like. While illustrated as one control system, the control system 50 may be part of a larger control system and may be controlled by various other controllers throughout the vehicle 10, such as a vehicle system controller (VSC). It should therefore be understood that the control system 50 and one or more other controllers can collectively be referred to as a "controller" that controls various actuators in response to signals from various sensors to control functions such as commanding a shaped torque to an actuator. Control system 50 may include a microprocessor or central processing unit (CPU) in communication with various types of computer-readable storage devices or media. Computer-readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the vehicle.

The control system may communicate with various vehicle sensors and other components via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU.

The control system 50 includes a torque-shaping controller 52 and an estimator 54. Both these components are designed to switch between the contact mode and the backlash mode, based on an estimation of the drivetrain status. Switches 56 change the controller system 50 between a contact mode controller 58 and a backlash mode controller 60. The switching is based on estimated twist and/or estimated change in twist of the drivetrain. Here, the drivetrain refers to the combination of the driveshaft and the half-shafts, which may be treated as a combined stiffness and damping for implementation simplicity. If the twist of drivetrain is greater than a first threshold, the switch selects the backlash controller. An example twist first threshold is 0.0 radians. During backlash mode, if the twist of the drivetrain is greater than a second threshold, the switches 56 select the contact controller 58 and the contact mode estimator 62. Typically, this second threshold is selected as the size of the lash, e.g., 0.5 radians. The above conditions could also involve the comparison of the change of the twist with a threshold and the change of the displacement with another threshold.

The switching allows for a specific design of each mode. This is beneficial since the physics of operation and the objectives of control in each of these two modes are different. The contact mode controller 58 may include a pre-compensator and a feedback controller. The contact mode controller 58 is configured to filter the driver-demanded torque such that this command does not excessively excite the drivetrain thus avoiding shuffle oscillations. The backlash mode controller 60 is configured to force the drivetrain to cross the backlash quickly while also ensuring that the impact speed (which influences the clunk) is kept small.

The estimator 54 may include a contact-mode estimator 62 and a backlash-mode estimator 64. The contact-mode estimator 62 is configured to estimate the time-derivative of the shaft torque, which indicates the level of shuffle and also influences the vehicle jerk. The backlash mode estimator 64 is configured to estimate the position and speed in the backlash, which, influences the drivetrain clunk. Variations of the system of FIG. 2 could also utilize as inputs the transmission output speed and, if the powertrain has a torque converter, the torque converter slip speed.

Figure 3:
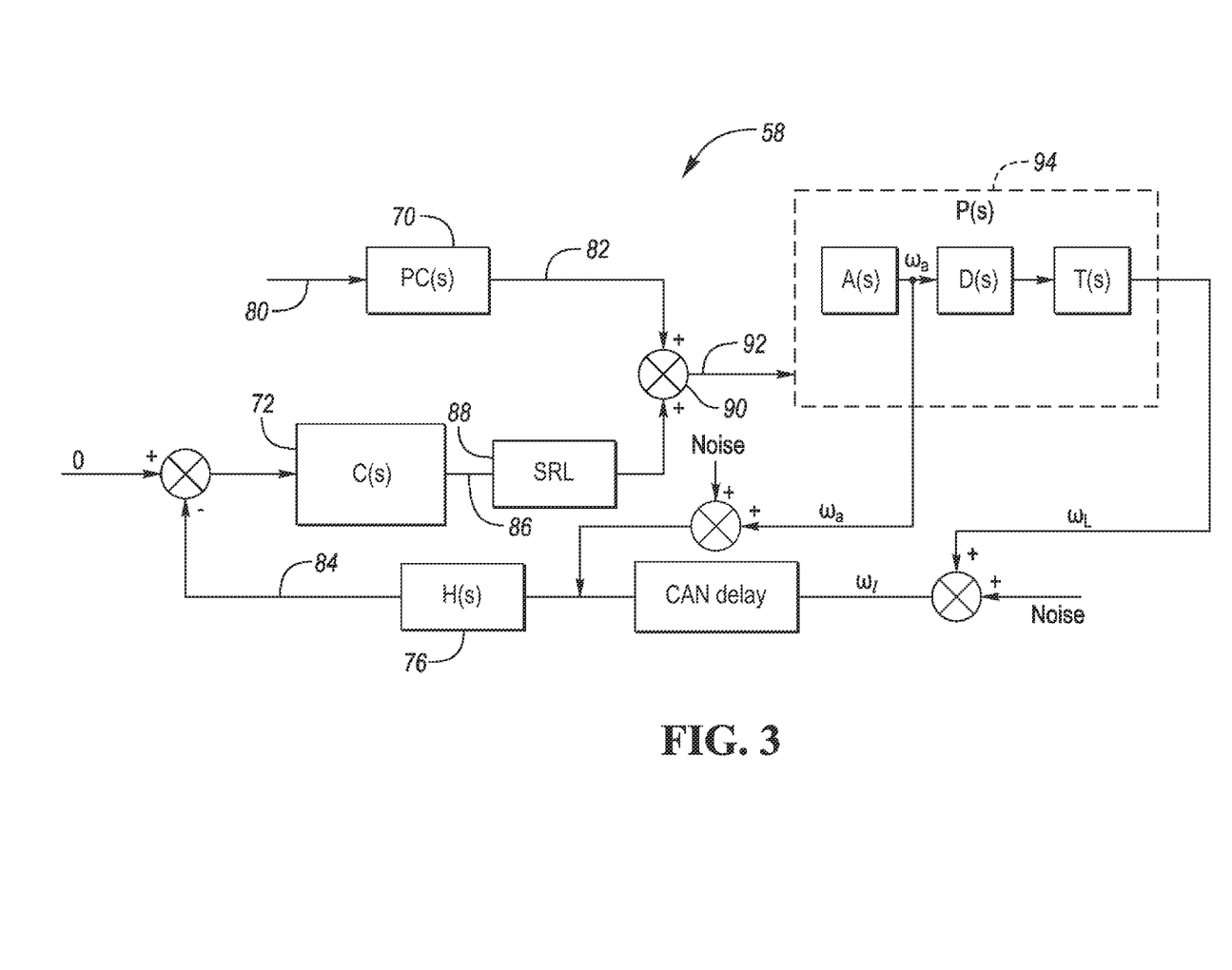
FIG. 3 is a schematic diagram illustrating a contract mode controller.

Referring to FIG. 3, the contact mode controller 58 may include a pre-compensator (PC(s)) 70 (feedforward controller) and a feedback controller 72. The pre-compensator 70 is configured to filter the driver-demanded torque. The pre-compensator 70 may be a low-pass filter such as a Butterworth filter, Chebyshev filter, or an Elliptical filter. A Butterworth low-pass filter is characterized by four parameters: the pass band frequency, $f_p$; the stop band frequency, $f_s$ (where $f_s > f_p$); the pass band ripple limit, $1-\delta_p$; and the stop band ripple limit $\delta_s$. The pre-compensator 70 may use standard values of $\delta_p$ and $\delta_s$. Regarding $f_p$ and $f_s$, the frequencies are selected such that $f_p$ and $f_s$ lie in the vicinity of the shuffle frequency $f_{shuffle}$. The resulting pre-compensator ensures a satisfactory response of the half-shaft torque to a step change in the driver-demand torque. (Here, the satisfactory response is quantified by specifications on the rise time, settling time, etc., of the shaft torque trajectory.) Since the shuffle frequency is a function of the transmission gear and the torque converter state (if equipped), the values of $f_p$ and $f_s$ are selected as functions of these variables as well. An example of a transfer function for the pre-compensator 70 is shown below in equation 1. Depending on the choices of $f_p$ and $f_s$, the order of the above transfer function could be smaller than or larger than 2.

$$PC(s) = \frac{\omega_n^2}{s^2 + 2\zeta\omega_n s + \omega_n^2}. \tag{Eq. 1}$$

The feedback controller 72 regulates the time-derivative of the shaft torque and may be selected as a lead compensator, C(s), in the form of equation 2.

$$C(s) = k_{1c}\left[\frac{1 + a_{1c}s}{1 + b_{1c}s}\right]. \tag{Eq. 2}$$

The value of $a_{1c}$ is selected to increase the damping of the lightly damped poles of the system, and $b_{1c}$ is selected such that the high frequency content of the output of the controller is kept small. Like before, the parameters $a_{1c}$, $b_{1c}$, and $k_{1c}$, are chosen as functions of the transmission gear and the torque converter state. Saturation limits may be imposed on the output of the controller. In order to meet the constraints of the actuator hardware, slew-rate limits may also be imposed on the output of the controller. The feedback controller 72 may be a proportional-derivative (PD) controller with a high-frequency pole.

The parameters of PC(s) and/or the C(s) may be modified based on a drive mode of the vehicle, e.g., sport, normal, snow, mud, sand, etc. Different vehicle manufactures have different names for their various drive modes. For example, normal mode is also known as touring or default mode, and sport mode is also known as track, racing, or competition mode. Some vehicles include multiple sport modes and use various names to differentiate between them. Used herein, "sport mode" describes any mode designed to provide an increased vehicle performance, and "normal mode" describes any mode associated with normal driving. The modes may be human and/or vehicle selected, e.g., the modes may be switched by a driver pressing a button or the vehicle may automatically switch modes based on sensed or inferred conditions.

The contact mode controller 58 may include a contact mode estimator 76. The estimator 76 provides filtered values of the actuator speed and the actuator acceleration, filtered values of the wheel speed and the wheel acceleration, and filtered time-derivative of the shaft torque. The estimator 76 may be based on a Kalman filter approach and may take the form of:

Prediction step: $\hat{x}_j(k+1|k) = A_j\hat{x}_j(k|k)$, k=0, 1, 2, ..., j=a, 1, $\hat{x}_j(0|0)=[0,0]^T$, Innovation step: $\hat{x}_j(k+1|k+1) = \hat{x}_j(k+1|k) + M_j[y_j(k+1) - C_j\hat{x}_j(k+1|k)]$, k=0, 1, 2, ..., j=a, 1, Estimated time derivative of shaft torque:

$$\hat{T}'_{ds}(k) = k_{ds}\left[\frac{\hat{\omega}_a(k)}{\rho} - \hat{\omega}_l(k)\right] + c_{ds}\left[\frac{\hat{a}_a(k)}{\rho} - \hat{a}_l(k)\right],$$

k=0, 1, 2, ....

wherein, $x_j$, j=a, 1, is the state vector, including of the actuator/wheel speed and acceleration, i.e., $x_j=[\omega_j, \alpha_j]^T$, j=a, 1;

$A_j$, j=a, 1, is the system matrix, i.e., $$A_j = \begin{bmatrix} 1 & T_{s,j} \\ 0 & 1 \end{bmatrix},$$

j=a, 1, and $T_{s,j}$, j=a, 1, is the sample time of the actuator/wheel speed;

$M_j$, j=a, 1, is the Kalman Filter innovation gain;

$y_j$, j=a, 1, is the measured actuator/wheel speed;

$C_j$, j=a, 1, is the output matrix, i.e., $C_j=[1, 0]$, j=a, 1; and $k_{ds}$ and $c_{ds}$ are the shaft stiffness and damping, respectively.

In addition to the above actuator and wheel speeds, variations of this estimator could also utilize transmission output speed as an input. The innovation gains of the estimator 76 may be selected as functions of the transmission gear and the torque converter state. Variations of the above system could involve other types of state estimators, such as the Luenberger observer.

Referring back to FIG. 2, the backlash controller 60 may be a bang-bang controller. A bang-bang controller is a feedback controller that switches abruptly between two states. The bang-bang approach is a time-optimal control design methodology for constrained input systems. The controller 60 applies only the maximum allowable or the minimum allowable values of the input in order to achieve point-to-point stabilization. The bang-bang controller may be programmed to execute Equation 3 during a tip-in event during lash:

$$T_a^* = \begin{cases} +u_{sat}, & \text{if } \theta_b - \alpha < \frac{-1}{2u_{sat}}\left(\frac{\omega_a}{\rho} - \omega_l\right)\left|\frac{\omega_a}{\rho} - \omega_l\right| \\ -u_{sat}, & \text{if } \theta_b - \alpha \geq \frac{-1}{2u_{sat}}\left(\frac{\omega_a}{\rho} - \omega_l\right)\left|\frac{\omega_a}{\rho} - \omega_l\right| \end{cases} \quad \text{(Eq. 1)}$$

Where, $T^*_a$ is the torque commanded to the actuator, $\pm u_{sat}$ is the maximum and minimum values of the torque command, $\theta_b$ is the position in the backlash, $2\alpha$ is the size of the backlash, $\omega_a$, is the actuator speed, and $\omega_l$ is the average value of the driven wheels speeds. When this controller is applied for torque shaping, the values of $\theta_b$, $\omega_a$, and $\omega_l$ are provided by the lash state estimator 64 described above. The values of $u_{sat}$ may be scheduled as a function of the driver-demand torque—if the driver demand is large, then the value of $u_{sat}$ is large as well. The values of $u_{sat}$ may be scheduled as a function vehicle mode, e.g., sport mode. The magnitude of $+u_{sat}$ may be larger and the magnitude of $-u_{sat}$ may be smaller in sport mode compared to normal mode.

A variation of the above controller could incorporate the predicted value of the position in the backlash, $\hat{\theta}_{b,pred}$, where this prediction is carried out to assess the value of $\theta_b$ at future time instances. The prediction could take into account the previously mentioned limitations of the actuator torque delivery, thereby allowing the bang-bang controller to modify the torque command well in advance of the predicted time of impact. This approach provides sufficient time for the actuator to modify its delivered torque, which results in smaller amount of clunk.

The backlash mode estimator 64 is explained in Applicant's U.S. Pat. No. 9,944,285 the contents of which are incorporated in their entirety by reference herein. In summary, the calculation of the shaft twist angle is utilized to ascertain the state of the drivetrain with respect to the backlash, and the difference of speeds across the backlash (i.e., the rate of change of shaft twist) is used to estimate and predict the position in the backlash and the speed of traversal of the backlash.

Control logic or functions performed by control system 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as control system 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

Figure 4:
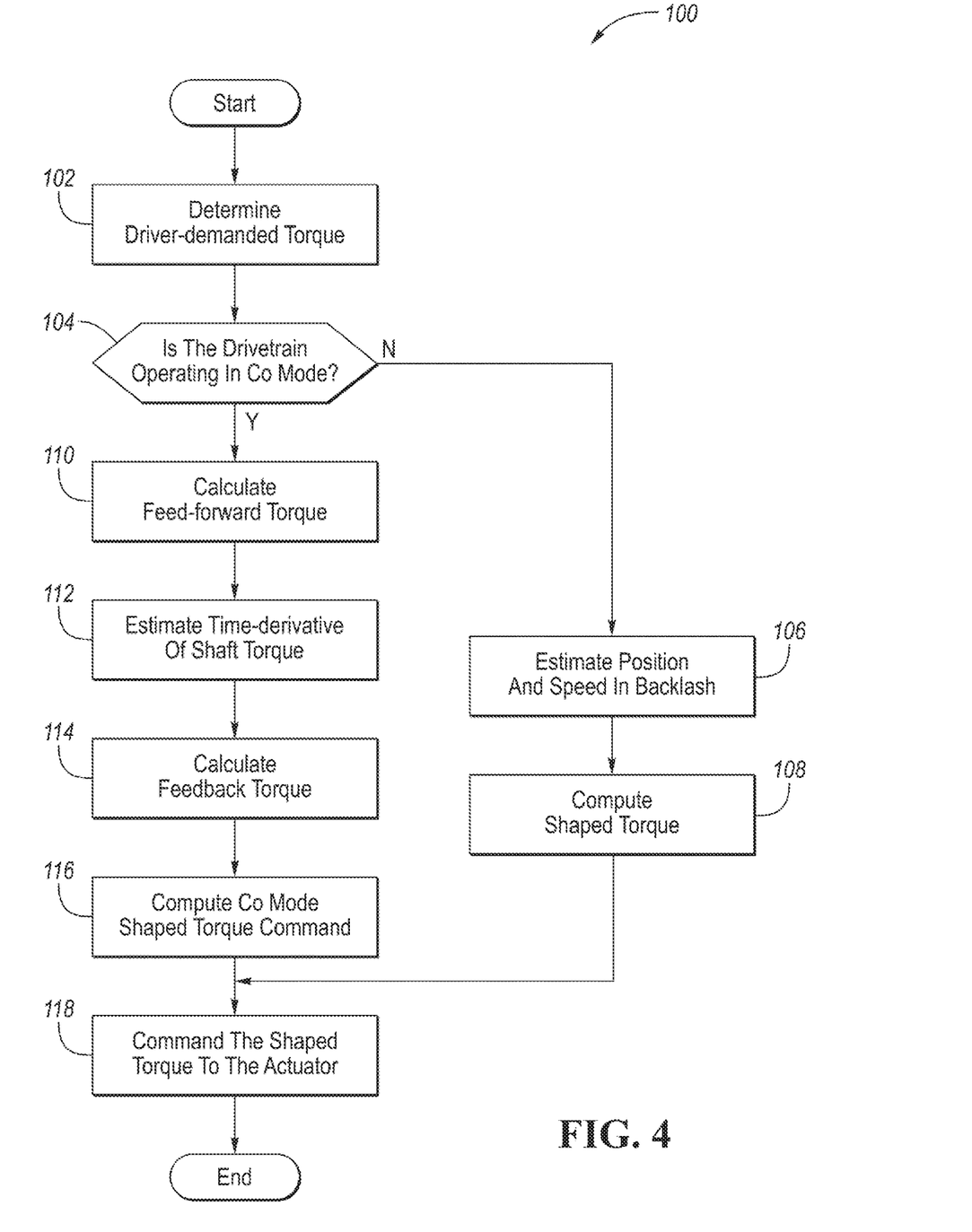
FIG. 4 is a flow chart illustrating an algorithm for shaping driver-demanded torque.

FIG. 4 is a flowchart 100 of an algorithm for shaping actuator torque. At operation 102, the controller determines a driver-demanded torque. The driver-demanded torque may be derived from the position of the accelerator pedal as measured by a pedal-position sensor. The pedal-position sensor is in electric communication with the controller and outputs a signal indicative of pedal position. The controller interprets this pedal-position signal to determine a driver-demanded torque. The controller estimates the drivetrain status, i.e. is the drivetrain in contact mode, at operation 104. This determination may be made via the switch 56 shown in FIG. 2. If the twist of the drivetrain (and/or the change in twist) exceeds a threshold, the drivetrain is in lash mode, and if the twist (and/or change in twist) of the drivetrain is less than the threshold, the drivetrain is in contact mode.

If no at operation 104, the drivetrain is in lash mode and control passes to operation 106. At operation 108, the controller estimates the speed and the position in the backlash. At operation 106, the controller determines the shape torque. Operation 108 refers to the bang-bang controls described above. If the controller ascertains that the drivetrain is far away from positive contact and is traversing the lash slow enough, $+u_{sat}$ is applied. If the controller ascertains that the drivetrain is close to positive contact and is traversing the lash fast enough, then it applies $-u_{sat}$. The torque determined in operator 108 is commanded to the actuator at operation 118.

If yes at operation 104, the drivetrain is in contact mode (either negative or positive) and control passes to operation 110. Referring back to FIG. 3 and continuing with FIG. 4, at operation 110, the controller calculates a feedforward torque. The feedforward torque is calculated using the pre-compensator 70. The pre-compensator 70 receives the driver-demanded torque 80, filters the torque, and outputs a feedforward torque 82.

At operation 112, the controller estimates the time-derivative of shaft torque using the estimator, H(s), 76. The estimator 76 receives, at least, $\omega_a$, (actuator speed) and $\omega_l$ (average driven wheels speeds), and estimates the time-derivative of shaft torque 84.

At operation 114, the controller calculates a feedback torque using the lead compensator, C(s), 72. The lead compensator 72 receives the time-derivative of the shaft torque 84 from the estimator 76 and outputs a feedback torque 86. The feedback torque 86 may be modified by a saturation-and-rate limit 88 prior to being combined with the feed forward torque 82 at summation 90. At operation 116, the feedback torque 86 and the feedforward torque 82 are summed and the contact-mode shaped torque 92 is output.

The shaped torque 92 is sent to the P(s) 94, which is responsible for controlling operation of the vehicle actuator(s) to achieve the shaped torque 92. At operation 118, the shaped torque 92 is commanded to the actuator(s) by the P(s) 94. The P(s) 94 may include an actuator portion, A(s), a drivetrain portion, D(s), and a tire portion, T(s). The A(s) may output a $\omega_a$ (actuator speed) to the estimator 76. The D(s) and the T(s) may output a $\omega_l$ (average driven wheels speeds) to the estimator 76.

During a drive cycle, passing though lash and transitioning between lash and contact modes are particularly challenging for mitigating clunk and shuffle. In the proceeding text, three different driving events will be described to highlight the benefits of the above-described controls.

Figure 5:
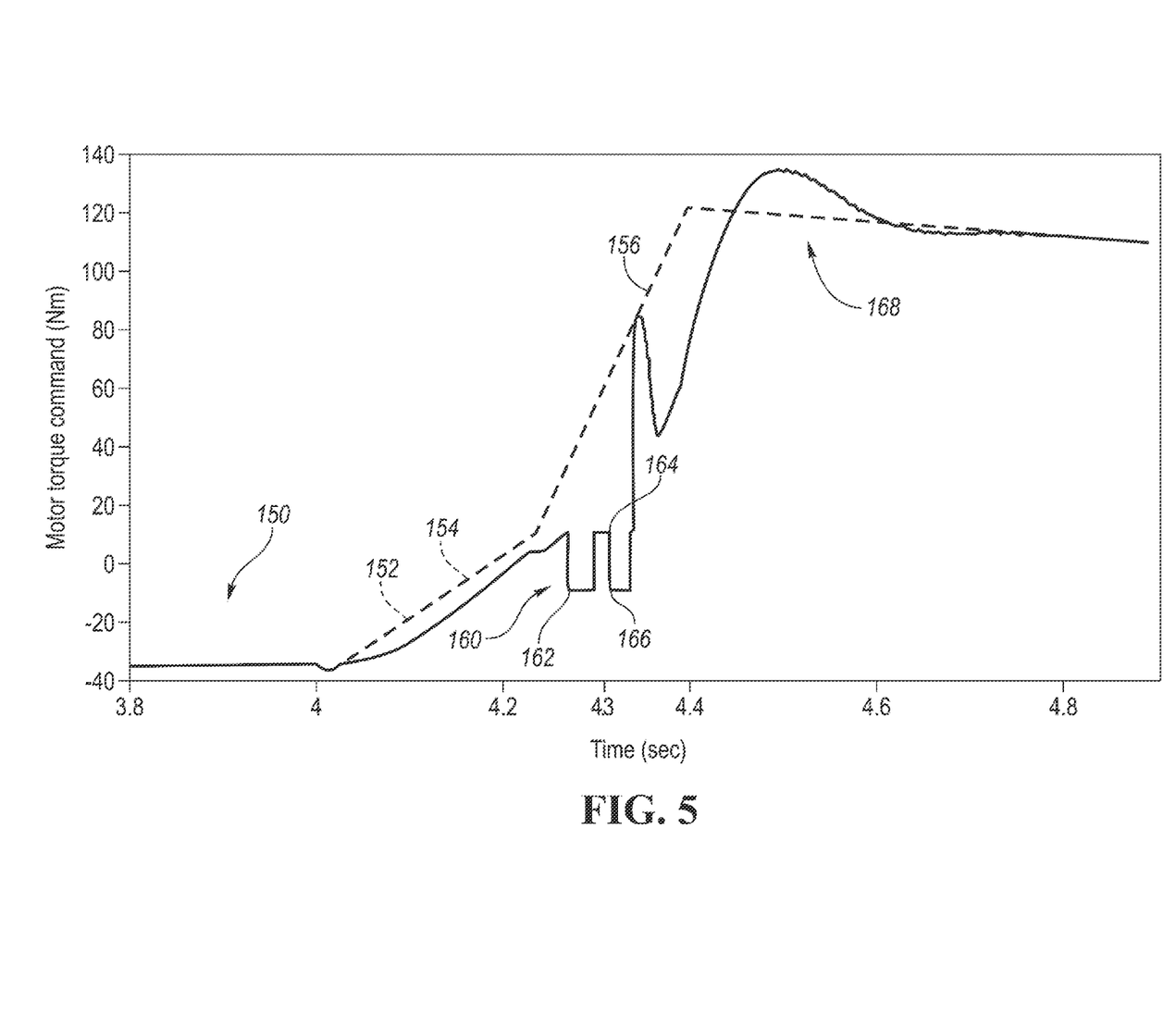
FIG. 5 is plot showing torque shaping for a first example driving scenario.

Referring to FIG. 5, an example lash crossing will now be described with reference to the backlash controller 60. The shown vehicle is electrified, but this is merely an example and could be a gas or diesel engine powered vehicle. As explained above, is ideal to cross lash as quickly as possible while also reducing impact speed at re-meshing. The controller 60 accomplishes this using non-monotonical torque shaping, i.e., pulsating torque in the lash phase. As explained above, the backlash controller 60 is a bang-bang controller that includes $+u_{sat}$ and $-u_{sat}$ values. The controller 60 is programmed to switch between these values to create a pulsating torque so that the drivetrain crosses lash quickly while also having a reduced impact speed to reduce clunk to acceptable levels. The controller switches between these $u_{sat}$ valves using equation 3.

At time 3.8 seconds, the vehicle is in negative contact mode 150 and is performing regenerative braking in which the motor is commanded to produce around −35 Newton meters (Nm) of torque. (Herein, positive torque refers to a torque that urges the vehicle forward, e.g., forward drive torque, and negative torque refers to a torque that urges the vehicle backwards, e.g., regenerative braking torque, engine braking torque, or reverse drive torque.) At time 4 seconds, the driver-demanded torque 152 (shown as a dashed line) begins to rise at a first rate 154 and subsequently rises at a second, steeper rate 156. Here, the driver has tipped-in (depressed the accelerator pedal) substantially near the lash crossing. This is a particularly problematic situation as it puts the controller in the difficult position of crossing the lash quickly to provide the drivers expected acceleration while also minimizing the impact force on the positive side of lash.

Following the second tip in event, the drivetrain switches from negative contact mode 150 to lash mode 160 near time 4.27 seconds. The controller may estimate the switch from negative contact mode 152 to the lash mode 160 by monitoring the twist or change in the twist of the drivetrain. That is, the controller determines the entry of the lash mode responsive to the twist or the change in the twist exceeding a threshold. Upon entry into the lash mode 160, the controller commands a $-u_{sat}$ torque 162 for a first duration of time. The controller then commands a $+u_{sat}$ torque 164 for a second duration of time. Finally, the controller commands another $-u_{sat}$ torque 166 for a third duration of time that ends when the teeth re-engage, which starts the positive contact mode 168. Said another way, the controller is programmed to receive the driver-demanded torque, and, responsive to the driver-demanded torque increasing at a rate exceeding a threshold and the drivetrain being in lash mode, (i) command a first torque to the actuator for a first duration of time, (ii) upon expiration of the first duration, command a second torque to the actuator that is greater than the first torque for a second duration of time, and (iii) upon expiration of the second duration, command a third torque to the actuator that is less than the second torque for a third duration of time. Wherein the first, second, and third torques are less than the driver-demanded torque.

In the illustrated example, the controller commands the first torque 162 to reduce the drivetrain speed through lash. However, this resulted in a lash crossing that was too slow for the steep rate of driver-demanded torque 156, and as such, the controller commanded a positive torque 164 to speed up the lash crossing. After commanding the positive torque 164, the controller determined that the impact speed would be too high if the controller continued to demand the torque 164. Thus, the controller demanded a second negative torque 166 to reduce speed of the drivetrain prior to re-engagement on the other side of the lash.

In the illustrated embodiment, the torque 162 and the torque 166 were the same due to the slope of the driver-demanded torque 156 being linear through the lash phase 160. If, for example, the driver demanded torque 156 was nonlinear through the lash phase 160, the torques 162 and

166 may be different than each other as the bang-bang torques may be based on a rate of change of the driver-demanded torque.

The durations of the first, second, and third times may all be the same or may be different. In the illustrated embodiment, the first duration of time is the longest, followed by the third duration of time, and the second duration of time is the shortest. In other embodiments, this may be different depending upon the initial value of the driver-demand torque, the rate of change of the driver-demand torque, the final value of the driver-demand torque, and the values of the calibrations involved in both the contact mode controller and the lash mode controller. These calibration values may also be influenced by the driver-selected mode or the inferred drive mode.

This of course is only one example and in other situations the controller may command more or less pulsations of torque or no pulsations of torque during lash. The controller may be programmed to only operate non-monotonically through the lash phase in response to the driver-demanded torque increasing at a rate exceeding a threshold and the tip-in event occurring either in close proximity to the start of lash or during lash. For example, if a large tip-in event occurs squarely within the negative contact mode, then the controller may only command the $-u_{sat}$ during lash. In other scenarios, the controller may only command the $-u_{sat}$ during lash if the driver-demanded torque has a slope below the threshold. In some embodiments, the controller may command a $+u_{sat}$ first to speed up the lash crossing followed by a $-u_{sat}$ command to reduce impact during re-engagement. The controller will command a $-u_{sat}$ torque to the actuator near the end of lash to reduce impact.

Figure 6:
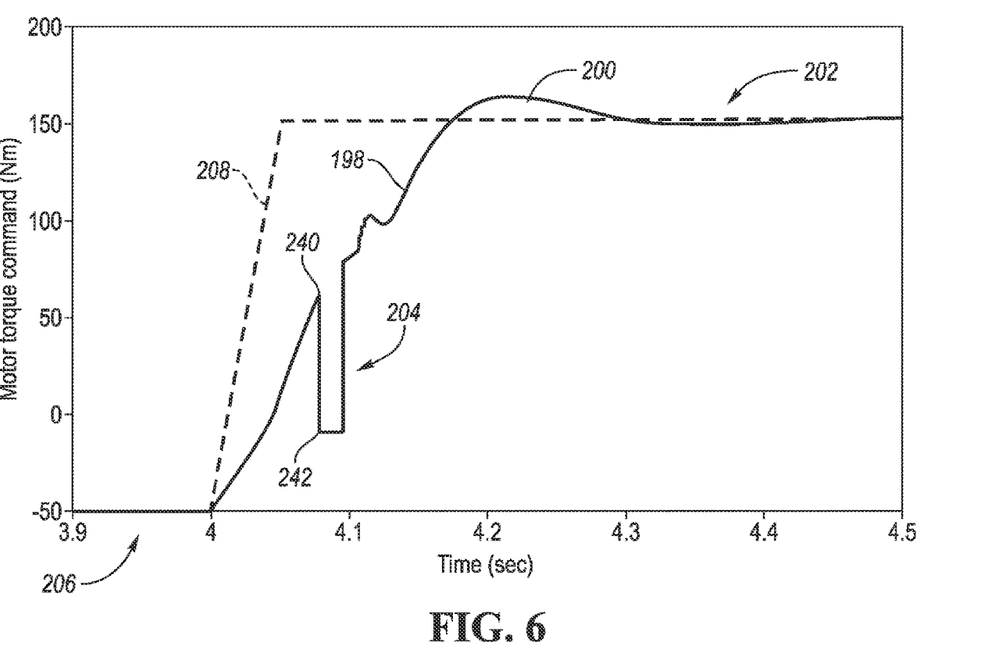
FIG. 6 is plot showing torque shaping for a second example driving scenario.

Referring to FIG. 6, in order to improve sportiness of the vehicle, the driver-demanded torque 208 (dashed line) may be shaped so that the controller commands a shaped torque 198 (solid line) in excess of the driver-demanded torque 208 to create a temporary torque overshoot command 200. The shown vehicle is electrified, but this is merely an example and could be an engine-powered vehicle. This overshoot command 200 occurs when the drivetrain is in contact mode such as the illustrated positive contact mode 202. In the illustrated embodiment, the torque overshoot command 200 occurs coming out of lash 204 as the vehicle went through a lash crossing. In other situations that do not include a lash crossing, the overshot occurs near the end of the torque shaping.

Starting at time 3.9, the vehicle is in negative contact mode 206 where regenerative braking is occurring. At time 4 seconds, the driver tips-in on the accelerator pedal causing a rapid increase in the driver-demanded torque 208. The change in driver-demanded torque 208 from a negative torque regenerative braking) to a positive torque causes the drivetrain to go through lash 204. The lash phase 204 ends at approximately time 4.1 seconds when the gearing re-engages on the other side of lash.

The positive contact mode 202 begins at time 4.09 seconds, at which point the contact mode controller 58 becomes responsible for shaping the driver-demanded torque 208. Following lash 204, the contact mode controller 58 begins to increase the commanded torque 198 to reduce the difference with the driver-demanded torque 208. Initially following lash, the controller 58 provides rate limiting and other anti-shuffle mechanisms to reduce the negative effects of shuffle as the drivetrain begins to twist due to the application of positive torque from the actuator. The twisting of the drivetrain stabilizes around time 4.18 seconds which coincides with the overshoot 200. During the overshoot command 200, the controller commands more torque than the driver is requesting for a predetermined time. Said another way, the controller is programmed to receive a driver-demanded torque, and, in response to the drivetrain exiting lash during acceleration, command a torque to the actuator, for a duration of time, that is greater than the driver-demanded torque to create a temporary torque overshoot. The time of the overshoot and/or the magnitude of the overshoot are based on the rate of change of the driver-demanded torque (i.e., the derivative of the driver-demanded torque).

The overshoot command 200 ends at time 4.3 seconds. Following the overshoot, the controller 58 commands torque to the actuator to produce the driver-demanded torque 208 as torque shaping is no longer necessary in this example. The controller will, however, continue to shape the torque if the driver-demanded torque will cause shuffle or other issues.

The magnitude and duration of the overshoot command 200 can be tuned by modifying the gains of PC(s) and C(s) to increase or decrease aggressiveness of the torque delivery. These gains may be different in different vehicle modes, e.g., touring motor sport mode, to provide the desired driving experience. For example, in sport mode, the gains may be adjusted so that the overshoot has a greater magnitude and duration than when in touring mode.

As discussed above, the control system 50 may utilize a bang-bang controller 60 during lash. In some instances, the bang-bang torque (e.g., $-u_{sat}$) may be much different than the last commanded torque of the contact mode resulting in a large step change during a transition from an offgoing mode to an oncoming mode. The vehicle 20 may limit the step change by clipping the commanded torque. Offgoing mode refers to the mode the vehicle was in, and oncoming mode refers to the mode the vehicle is switching to. In FIG. 6, at time 4.09 seconds, the drivetrain is transitioning from the offgoing mode (negative contact mode) to the oncoming mode (lash mode) and, at time 4.1 seconds, the drivetrain is transitioning from the offgoing mode (lash mode) to the oncoming mode (positive contact mode). The term "transitions" refers to the time period covering the last torque command of the offgoing mode and the initial torque command of the oncoming mode.

Equation 4, which may be programmed into memory of the control system 50, may be used to prevent large step changes in torque during transitions. If equation 4 is satisfied, the bang-bang torque is commanded to the actuator. If equation 4 is not satisfied, the bang-bank torque is clipped so that the difference between the final torque and the initial torque is equal to the threshold. The threshold will vary by vehicle but an example threshold may be between 50 and 100 newton meters (Nm).

$$|\text{Final Torque Offgoing Mode} - \text{Initial Torque Oncoming Mode}| \le \text{Threshold} \qquad \text{(Eq. 4)}$$

The controller may utilize equation 4 during transitions, i.e., in response to the drivetrain changing from an offgoing mode to an oncoming mode. The controller is programmed to (i) command the initial torque to the actuator for a first duration of time and (ii) command a second torque to the actuator for a second duration of time that immediately follows the first duration of time if a difference between an initial torque command of the oncoming mode and a last torque command of the offgoing mode is less than a threshold. The controller is also programmed to (i) command a clipped torque to the actuator for the first duration of time and (ii) command the second torque to the actuator for the second duration of time that immediately follows the first duration of time if a difference between the initial torque command and the last torque command exceeds a threshold.

This torque clipping will now be described with reference to FIG. 6 (no torque clipping) and FIG. 7 (torque clipping). In these embodiments, the threshold is 75 Nm. Referring to FIG. 6, the last torque 240 of the offgoing mode (negative contact mode 206) is roughly 60 Nm and the initial bang-bang torque 242 of the oncoming mode (lash mode 204) is roughly −12 Nm. Here, the spread is 72 Nm, which is less than the threshold. As such, the bang-bang torque 242 is not clipped and is commanded to the actuator.

Figure 7:
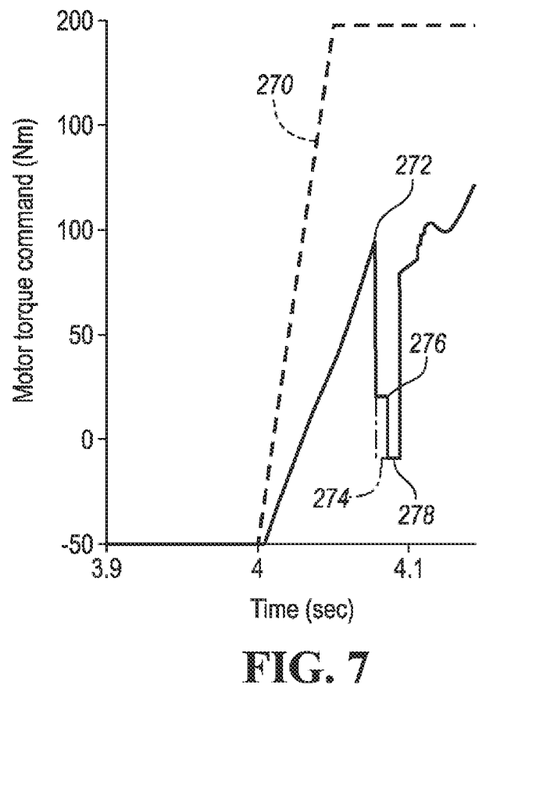
FIG. 7 is plot showing torque shaping for a third example driving scenario.

Referring now to FIG. 7, the driver-demanded torque 270 (dashed line) has a steeper slope and a larger magnitude than the driver demanded torque 208. The last commanded torque 272 of the offgoing mode (negative contact mode) is roughly 90 Nm and the initial bang-bang torque 274 of the oncoming mode (lash mode 204) is roughly −12 Nm. Here, the spread is 102 Nm, which is greater than the threshold. As such, the bang-bang torque 274 must be clipped to limit the step change to be less than or equal to the threshold. The controller clips the calculated bang-bang torque 274 and commands a torque of 15 Nm to the actuator as shown by callout 276. The clipped torque may be applied for one iteration of the control loop as shown. In other embodiments, the clipped torque may be applied for more than one iteration depending upon the cycle time of the controller. In the next control loop, the controller commands the bang-bang torque to the actuator as shown by callout 278.

The magnitude of the threshold may be a constant value or may be a dynamic value that changes based on the operating mode of the vehicle. For example, the threshold may be increased when the vehicle is in sport mode as compared to a touring mode to improve vehicle performance. Additionally, drivers expect increased clunk and shuffle associated with sport mode and therefore the large step change does not create unacceptable driving characteristics.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   an actuator;
   a drivetrain configured to receive mechanical power from the actuator;
   an accelerator pedal position sensor configured to output a driver-demanded torque; and
   a controller in electric communication with the sensor and the actuator, the controller programmed to:
   receive the driver-demanded torque, and
   responsive to the driver-demanded torque increasing at a rate exceeding a threshold and the drivetrain being in lash mode, (i) command a first torque to the actuator for a first duration of time, (ii) upon expiration of the first duration, command a second torque to the actuator that is greater than the first torque for a second duration of time, and (iii) upon expiration of the second duration, command a third torque to the actuator that is less than the second torque for a third duration of time, wherein the first, second, and third torques are less than the driver-demanded torque.

2. The vehicle of claim 1, wherein first torque and the third torque have the same magnitude.

3. The vehicle of claim 1, wherein the first torque is a negative torque and the second torque is a positive torque.

4. The vehicle of claim 3, wherein the third torque is a negative torque.

5. The vehicle of claim 1, wherein the first duration is longer than the second duration.

6. The vehicle of claim 1, wherein the first, second, and third torques are constant throughout their duration.

7. The vehicle of claim 1, wherein the first, second, and third torques are based on an operating mode of the vehicle.

8. The vehicle of claim 7, wherein the first, second, and third torques are greater when the vehicle is in a sport mode than when the vehicle is in a touring mode.

9. A vehicle comprising:
   an actuator;
   a drivetrain configured to receive mechanical power from the actuator;
   an accelerator pedal position sensor configured to output a driver-demanded torque; and
   a controller programmed to:
   receive the driver-demanded torque, and
   in response to the drivetrain exiting lash and the driver-demanded torque indicating vehicle acceleration during the exiting of the lash, command a torque to the actuator, for a duration of time, that is greater than the driver-demanded torque to create a temporary torque overshoot, wherein the duration of time and a magnitude of the torque are both based on the driver-demanded torque.

10. The vehicle of claim 9, wherein the duration of time and the magnitude of the torque are both based on a rate of change of the driver-demanded torque.

11. The vehicle of claim 9, wherein the controller is further programmed to command a torque that is equal to the driver-demanded torque in response to the duration of time ending.

12. The vehicle of claim 9, wherein the magnitude of the torque is based on a vehicle drive mode.

13. The vehicle of claim 12, wherein the magnitude of the torque is increased when the drive mode is in sport.

14. A vehicle comprising:
   an actuator;
   a drivetrain configured to receive mechanical power from the actuator; and
   a controller programmed to,
   in response to the drivetrain changing from an offgoing mode to an oncoming mode, and a difference between an initial torque command of the oncoming mode and a last torque command of the offgoing mode being less than a threshold, (i) command the initial torque to the actuator for a first duration of time and (ii) command a second torque to the actuator for a second duration of time that immediately follows the first duration of time, and in response to the drivetrain changing from an offgoing mode to an oncoming mode, and a difference between the initial torque command and the last torque command exceeding the threshold, (i) command a clipped torque to the actuator for the first duration of time and (ii) command the second torque to the actuator for the second duration of time that immediately follows the first duration of time.

15. The vehicle of claim 14, wherein the clipped torque is less than the initial torque.

16. The vehicle of claim 14, wherein the initial torque and the second torque are the same.

17. The vehicle of claim 14, wherein the oncoming mode is lash mode and the offgoing mode is contact mode.

18. The vehicle of claim 17, wherein the contact mode is a negative contact mode, and wherein the clip torque is equal to the last torque command plus the threshold.

19. The vehicle of claim 17, wherein the drivetrain changes from the contact mode to the lash mode in response to a change in the twist or a rate of change of the twist of the drivetrain exceeding a second threshold.

20. The vehicle of claim 14, wherein the oncoming mode is lash mode and the offgoing mode is negative contact mode, and wherein the controller is further programmed to, in response to the drivetrain changing from lash mode to a positive contact mode, command a third torque that is greater than the second torque.

* * * * *